United States Patent [19]

Bussienne et al.

[11] 3,848,755
[45] Nov. 19, 1974

[54] ELECTRO-MECHANICAL LOAD TRANSFER DEVICE FOR DYNAMIC STORAGE

[76] Inventors: Christian Bussienne, 4 Av. Se Pa Rivette, 27600 Louviers; Dominique Mary, "La Jouche", Elbeuf-76, both of France

[22] Filed: Dec. 29, 1972

[21] Appl. No.: 319,477

[30] Foreign Application Priority Data
Jan. 12, 1972 France .................. 72.00899

[52] U.S. Cl. .................. 214/16.4 A, 214/620
[51] Int. Cl. .................. B65g 1/06
[58] Field of Search ..... 214/16.4 A, 16.4 B, 16.4 C, 214/16 B, 16.1 DB, 620; 191/2-3, 12 R, 12.2 R, 12.4

[56] References Cited
UNITED STATES PATENTS

| 1,879,713 | 9/1932 | Scott | 214/16.1 DB |
| 3,417,879 | 12/1968 | Gough | 214/16 B |
| 3,709,383 | 1/1973 | Jennings et al. | 214/16 B |

FOREIGN PATENTS OR APPLICATIONS
262,893   6/1968   Austria .................. 214/16.4 B
382,975   12/1964   Switzerland .................. 214/16.1 CC

*Primary Examiner*—Robert J. Spar
*Assistant Examiner*—R. B. Johnson
*Attorney, Agent, or Firm*—Cushman, Darby & Cushman

[57] ABSTRACT

The invention relates to electro-mechanical load transfer devices in a dynamic storage installation, having a series of gangways fitted with rails on which trolleys known as "Transrobots" can circulate of a kind particularly suited to the use of two loaders able to place one transrobot at the entrance to a gangway and another at the exit. Loader and transrobot remain connected by an electric calle carried by a winder on the transrobot. The loader, brought by a hoist to the end of a preselected gangway, puts its transrobot on its rails, centering it by means of oblique slide bars, and simultaneously connects the electric control circuits by means of a safety connection.

The invention relates particularly to installations comprising a large number of gangways and a relatively static stock.

8 Claims, 7 Drawing Figures

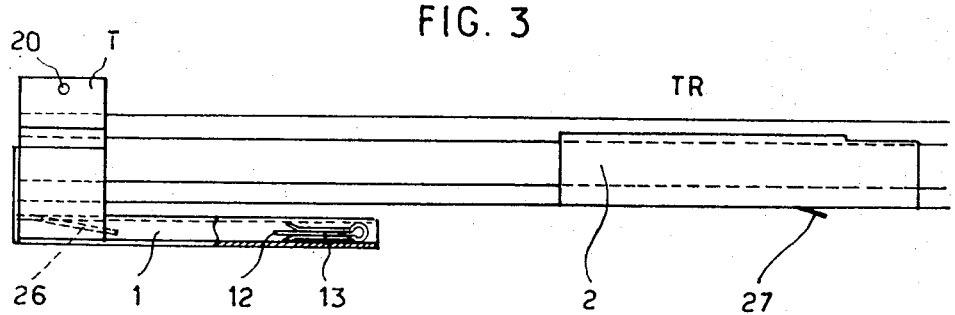
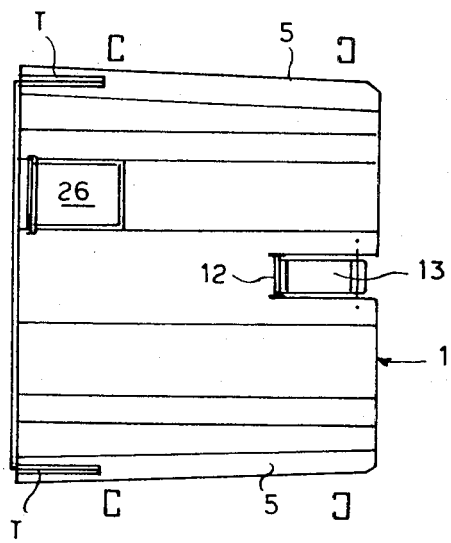
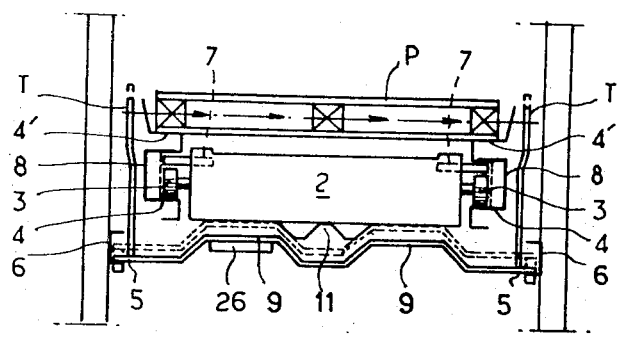

ELECTRO-MECHANICAL LOAD TRANSFER DEVICE FOR DYNAMIC STORAGE

The present invention relates to electro-mechanical devices making it possible to transfer loads in a dynamic storage installation.

Dynamic storage installations are known, which comprise mobile hoists in an entry gangway and an exit gangway, and which can position at both ends of the storage gangways a transfer trolley capable of picking up flat trolleys which move on the rails of said storage gangways and which are designed to transport and put down loads there. But the proper positioning of these transfer trolleys called for complicated devices such as jacks and feelers to detect and correct positioning errors in front of the gangways.

In particular applicants' U.S. Pat. No. 3,458,060 for an "Electro-mechanical Device for Transferring Loads Along a Horizontal Track" describes a removable flat trolley, now known by the name of "Transrobot," with a platform capable of assuming two positions, namely, "up" to lift the loads and "down" to put them down. The flat trolley circulates underneath the loads and is thus able to take them from the entrance to the exit of a gangway. The trolley is fitted with electrical circuits and contacts allowing for complete automatic or remote controlled maneuvers for loading, unloading and assembling loads near the gangway exit. Applicants also have a second U.S. Pat. No. 3,557,973 for an "Electro-mechanical Transfer Device for a Dynamic Storage Installation" which describes a remote controlled transfer trolley which positions itself precisely at the entrance or exit of a storage gangway. The transfer trolley comprises portions of rails and electric cables making it possible to pick up the "Transrobots" themselves, or the loads which they put down, and to transport them to another preselected gangway.

The present invention relates more particularly to the case of an installation comprising a large number of storage gangways and a stock which rotates relatively little; its aim is to simplify the equipment and its automation as compared to the prior art, with a view to reducing investment costs, in particular by eliminating the presence of an electric cable in each passage and by reducing the number of "Transrobots" required.

The present installation is intended for dynamic storage which has at least one storage level comprising a structure forming a plurality of juxtaposed gangways equipped with rails, an entrance gangway and an exit gangway arranged perpendicularly to the storage gangways and, at the ends of the latter, at least one flat trolley moving on the rails and whose load-supporting surface assumes an "up" position in which it transports the loads, and a "down" position in which it circulates freely beneath them, placed as they are on two top supporting rails, said trolley being equipped with electric components capable of providing automatic control of its movements with a view to loading, unloading and assembling the loads nearer the exit of the gangway, and is characterised, for a set of several gangways, by a single flat trolley at the entrance and a single flat trolley at the exit, each co-operating with a loader and with means of introducing it into the selected gangway, each loader comprising a support unit and components for centering on the loader and the trolley, co-operating with the slide bars with which each gangway is fitted at its ends, the loader being connected to the corresponding trolley by an electric cable wound on the drum of a winder placed inside the trolley, the cable being laid in or taken up from the gangway as the trolley moves, the loader comprising a male plug which, when it is put in at the end of a gangway, automatically engages a female plug connected to a cable fixed on the structure, so as to provide the electric feed to the control components.

The appended drawings illustrate, by way of example, one mode of embodiment of the device in accordance with the invention.

FIG. 1 a perspective general view of the trolley known as a "Transrobot" on its loader, facing the rails of a storage gangway.

FIGS. 2 and 3 show the loader in, respectively, plane and profile.

FIG. 4 is a section of a loader with its transrobot, and the sections serving rails and as supporting surfaces for the pallets.

FIG. 1a is a schematic representation of the juxtaposed gangways which are equipped with rails 4 and the entrance and exit gangways which are arranged perpendicularly to the storage gangways.

Figures 1, 1A:
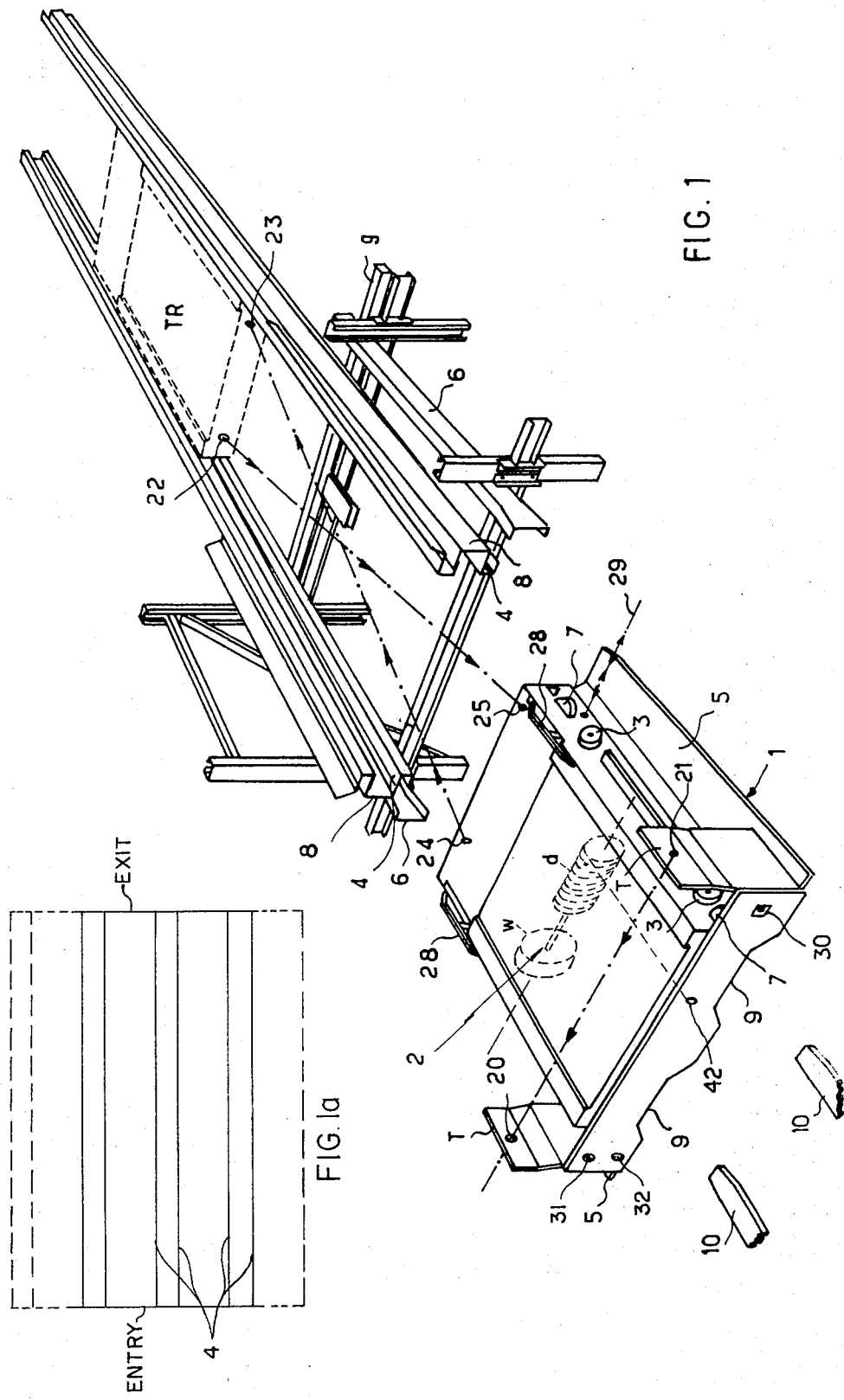
FIG. 1a is a schematic representation of the relative positions of the parallel gangways and the exit and entrance gangways.

FIGS. 1, 4 show a loader 1, which is a thick sheet metal platform serving as a support for the "Transrobot" 2 (FIGS. 1, 3, 4), a flat automobile trolley with four wheels 3 designed to circulate on the rails of two sections 4–8 of one of the storage gangways where the loader has put it.

Each of these sections has a horizontal rolling surface, a vertical lateral guide surface 8 which co-operates with horizontal wheels 7 carried by the "Transrobot," and a second horizontal surface 4' on which the "Transrobot" can lay down the pallets P (FIG. 4).

The supplementary details are described below. The loader has lateral edges 5 which converge slightly to slide into oblique slide bars 6, designed to support and center them. Side walls 8 of the sections have the same obliquity to allow entry or exit of the "Transrobot" guided by its horizontal wheels 7 which can turn on said side walls 8.

FIGS. 1 and 4 show the structured shape of the loader's bottom whose raised parts 9 allow the insertion of the forks 10 of a hoist which places the loader and its "Transrobot," either empty or supporting a pallet, in one of the gangways, and at the selected storage level.

In FIG. 4 loader 1 is shown in solid lines in the "down" position wherein the "Transrobot" 2 is placed on its rails 4, and in broken lines in the "up" position wherein the "Transrobot" is introduced onto its rails. The lower part of the "Transrobot" conforms to the V shaped central structure between the two grooves 9 of the loader, but its W shape leaves free a central channel 11 designed for passage of an electric supply cable, on end of which is fixed at 42 on the loader (FIG. 1), said cable being wound on the drum $d$ of "Transrobot" winder $w$ which pays it out or takes it up without sliding on crosspieces of the structure when the "Transrobot" moves.

Figure 5:
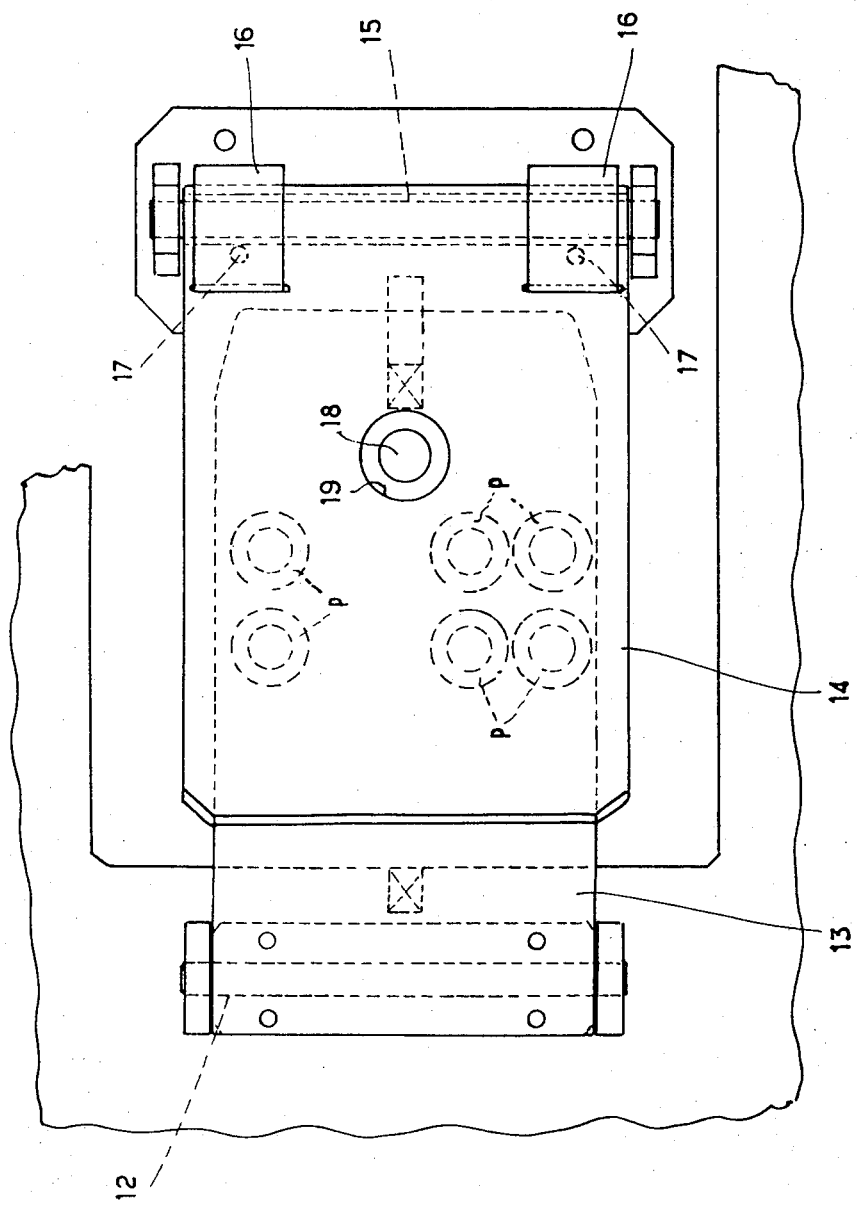
FIGS. 5 and 6 show, respectively in plane and in a section, the loader's disconnectable plug.
Figure 6:
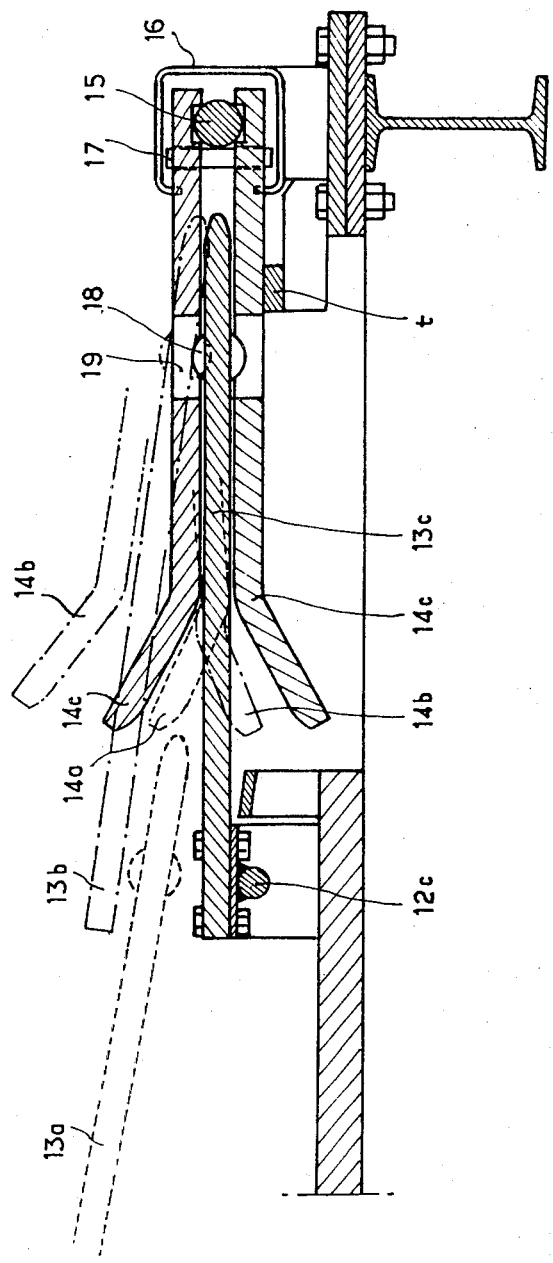

The voltage is applied to the said electric supply cable by a disconnectable plug (FIGS. 5 and 6), whose male part is intergral with the loader, and whose female part is fixed to the structure of each storage gangway. FIG. 6 shows in dotted lines, marked a, the components of the plug before connection, the loader in the "up" position thus raising the male part; c marks the final position of the connected plug, the loader having descended to the "down" position. The discontinuous line marked b, shows the intermediate position where the connection has just been made, the loader still being in the "up" position.

A male plug articulated on the loader at 12 consists of a small insulating tongue 13 (FIGS. 2, 3, 5 and 6) comprising multiple contact-studs connected to the six-wire cable (not shown) of the "Transrobot" winder. The female plug placed on the structure of the gangway where it is connected to a cable g, consists of two insulating lips 14 articulated round an axis 15, and attached by two pinching springs 16 and a safety keeper-pin 17 (FIG. 6), the whole resting on a block t fixed to the structure. Said lips 14 are splayed so that the end of blade 13 can open them and insert itself between them when the loader in the "up" position offers this blade at the corresponding height. During insertion of the loader on to the slide bars 6, blade 13 can penetrate between the lips 14, by means of two articulations 12 and 15; said blade has a catch 18 which holds the lips 14 apart so long as it does not drop back into the double gap 19 of the two lips, and springs 16 then provide the multiple contacts between the contact-studs of male blade 13 and lips 14; thus no accidental contact is possible, and a green signal lamp shows that a voltage has been applied.

The automatic control devices of the "Transrobot" are, in principle, the same as those described in the above-mentioned patents, and their adaptation to the new invention is within the scope of a technician.

On the loader, two vertical lateral metal plates support, respectively a cell 20 and a reflector 21 whose out and back light path detects the presence or absence of a pallet on the "Transrobot" placed on the loader. Coupled cells and reflectors 22, 23, 24, 25 placed respectively at the front and rear of the "Transrobots" which may be present in the same gangway, one introduced at the entrance, the other at the exit, allow telemetric detection of a minimum safety distance and prevent collisions, using known electrical means. The loader also has a control flap 26 (FIGS. 2, 3, 4) whose function will be described below.

The "Transrobot" has an end of course flap 27 (FIG. 3) and two feelers 28, designed to center it precisely in order to receive pallets, and a side cell 29 (FIG. 1) which reacts when the "Transrobot" arrives at the end of the gangway, by means of a reflector (not shown) placed opposite on the structure.

Finally the gangway exit loader has a switch 30 making it possible to substitute a "step-by-step" exit of the pallets in place of their automatic assembly.

Thus the installation operates as follows:

The loader carrying its transrobot is introduced by the hoisting device into the end of a chosen gangway. During this insertion, the male plug fixed to the loader connects automatically with the female plug on the structure of the gangway and the green lamp signalling the application of a voltage to the transrobot lights up. The hoisting device places the loader on the lower slide bars 6, and during this placing the transrobot separates from its loader by positioning itself on the rails 4 of slide bars 8. The hoisting device disengages its forks 10, during a calculated delay provided in the electric control circuits. The transrobot leaves its loader and moves a little way into the gangway, stops and goes back, stopping again in a precise position, due to an end of course cut-off controlled by flap 27 placed beneath the transrobot. This movement creates a precise space between loader and transrobot, said space, when a pallet is loaded, enabling the transrobot to back and centre itself under it by means of its feelers 28.

The placing of a pallet at the end of the gangway then sets in motion the procedures described in the applicant's aforementioned patents, with an adaptation to the present case which is within the scope of a technician.

To change the loader and its transrobot from one gangway to another, when the forks 10 of the hoist are inserted into the loader, said forks operate the flap 26, which immediately controls both the return of the transrobot inside its loader and the lighting of a yellow signal 31.

The operations for inserting a loader equipped with a transrobot at the exit end of the gangway, are carried out in the same way as at the entry end; introduction by the hoist of the loader-transrobot unit, connection of the plug, lighting of the voltage application signal lamp 32, disengagement of the hoist forks.

Two states are possible for an insertion gangway.

In the first case, at least one pallet is left at the exit end of this gangway. When this is removed, the cell which detects the presence of a pallet, identical with the device 20–21 of the loader at the entry end, controls the assembly of the next box-pallet pile.

If during assembly the hoist removes the last pallet on the exit side, the transrobot stops assembling and recommences it from the exit position. After assembly, its end-of-gangway detection cell 29 reverses the transrobot at the end of the gangway on the entrance side, and returns it to stand in its loader where the unit is ready to be changed to another gangway.

In the second case, there is no pallet at the end of the gangway and the transrobot carries out assembly as stated above. But if it is not desired to carry out systematic assembly, locking button 30 is used to set the transrobot in a "one-by-one" cycle.

Moreover, two transrobots can work together in the same gangway, one on the loading side, the other on the exit side. When they approach to within a certain preset distance, their respective anti-collision cells 22–25 control: in the case of the "loading" robot, the setting down of the pallet which it is stacking and its return, backing to its loader; in the case of the "exit" transloader, return to its loader, as if it had reached the end of the gangway.

One can see the economic advantage of the installation just described, by way of example, without however restricting the scope of the invention. A transrobot can serve some 20 gangways, and there is only one winder with it, as against 20 electric cables along the gangways. The reliability of this single winder is moreover greater than that of 1,000 metres of laid and vulnerable cable.

We claim:

1. A dynamic storage installation having at least one storage level comprising:

a structure forming a plurality of juxtaposed storage gangways fitted with two load supporting rails, an entrance gangway and an exit gangway placed perpendicularly to said storgage gangways at their ends, at least one flat trolley movable on said rails, said trolley having a vertically movable load bearing surface which assumes an up position relative to said load supporting rails in which it transports the load relative to said storage gangway, and a down position relative to said load supporting rails in which it deposits a load on said rails and freely moves below said load, said trolley being equipped with electrical control components capable of ensuring automatic control of its movements for effecting loading, unloading and assembly of loads toward the gangway exit, a single flat trolley as said entrance gangway and a single flat trolley at the exit gangway, a loader with which each of said trolleys co-operate means for introducing said loader into a selected gangway, each loader comprising a support element and components for centering said loader and trolley relative to said storage gangway, a portion of said support element cooperating with slide bars with which each storage gangway is fitted at its ends, an electric cable, a drum and winder means, said cable and drum and winder means being mounted on each trolley, said loader being connected to the corresponding flat trolley by said electric cable wound on said drum and winder means, said cable being laid down or taken up along said storage gangway as said trolley moves therealong, and a female plug and power cable mounted on said structure at the end of each storage gangway, said loader further comprising a plug which engages automatically with said female plug and power cable so as to provide an electricity supply to the electrical control components of said trolley.

2. Dynamic storage installation in accordance with claim 1, further comprising a light signal indicating the application of a voltage to the flat trolley, and another light signal indicating the presence of said flat trolley on its loader.

3. Dynamic storage installation in accordance with claim 1 wherein said loader has a structured bottom allowing it to be supported by said introducing means, said introducing means comprising hoist forks and wherein the trolley to be centered has a bottom shape conforming to that of the loader.

4. The installation of claim 3 wherein said component for centering the loader comprises convergent lateral sides attached to the frame of the loader, and side guidewheels mounted on said trolley and engageable with the vertical surfaces of said rails, and wherein said slide bars at the ends of the storage gangways are obliquely oriented to said upper surfaces of said load-supporting rails to thereby gradually center the loader and trolley relative to said storage gangway.

5. The installation of claim 1, wherein said trolleys have cell and oblique reflector units at the front and the rear thereof for allowing two trolleys to operate simultaneously in the same storage gangway, one towards the entrance gangway, the other towards the exit gangway, said units being operatively connected to said electrical control components for detecting the approach of the two trolleys to maintain a minimum distance therebetween and thereby prevent said trolleys from colliding.

6. Installation in accordance with claim 3, wherein said loader has a control flap operated by said hoist forks for controlling the return of the trolley from the storage gangway to the loader.

7. Installation in accordance with claim 6 wherein said trolley has an end of course control flap which stops it at a waiting position near its loader.

8. The installation in accordance with claim 1 wherein said male plug includes a blade portion and a catch portion and wherein said female plug includes a pair of lips normally spring biased closed wherein said male plug of said loader engages between the lips of said female plug which is connected to said cable on said structure, said lips being open slightly against said spring bias by means of said catch on said male plug and reclosing as soon as said catch falls into holes provided in said female plug.

* * * * *

UNITED STATES PATENT OFFICE
CERTIFICATE OF CORRECTION

Patent No. 3,848,755      Dated November 19, 1974

Inventor(s) Christian Bussienne and Dominique Mary

It is certified that error appears in the above-identified patent and that said Letters Patent are hereby corrected as shown below:

IN THE HEADING:

Please add:

-- [73] Constructions Mills, Saint-Ouen, France --

Signed and sealed this 29th day of April 1975.

(SEAL)
Attest:

RUTH C. MASON
Attesting Officer

C. MARSHALL DANN
Commissioner of Patents
and Trademarks